United States Patent
Albers et al.

(10) Patent No.: US 6,223,188 B1
(45) Date of Patent: Apr. 24, 2001

(54) PRESENTATION OF LINK INFORMATION AS AN AID TO HYPERMEDIA NAVIGATION

(75) Inventors: Michael C. Albers, San Francisco; Eric D. Bergman, Palo Alto, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/656,559

(22) Filed: May 31, 1996

Related U.S. Application Data

(60) Provisional application No. 60/019,052, filed on May 6, 1996, and provisional application No. 60/015,249, filed on Apr. 10, 1996.

(51) Int. Cl.[7] ............................. G06F 13/38; G06F 17/30
(52) U.S. Cl. ............................. 707/501; 707/51; 345/348
(58) Field of Search ................................... 707/501, 513, 707/500; 345/302, 348

(56) References Cited

U.S. PATENT DOCUMENTS

| | | | |
|---|---|---|---|
| 5,467,288 | * 11/1995 | Fasciano et al. | 345/302 |
| 5,572,643 | * 11/1996 | Judson | 395/155 |
| 5,623,589 | * 4/1997 | Needham et al. | 345/302 |
| 5,701,451 | * 12/1997 | Rogers et al. | 395/600 |
| 5,706,507 | * 1/1998 | Schloss | 709/225 |
| 5,737,619 | * 4/1998 | Judson | 395/761 |
| 5,748,186 | * 5/1998 | Raman | 345/302 |
| 5,778,181 | * 7/1998 | Hidary et al. | 395/200.48 |
| 5,790,793 | * 8/1998 | Higley | 707/513 |
| 5,805,815 | * 9/1998 | Hill | 707/501 |
| 5,923,846 | * 7/1999 | Gage et al. | 395/200.43 |
| 5,978,847 | * 11/1999 | Kisor et al. | 709/227 |

OTHER PUBLICATIONS

Mark R. Brown Special Edition Using Netscape 2 Second Edition, 1995.*
Albers, Michael C., Bergman, Eric, (May, 1995). "The Audible Web: Auditory Enhancements For Mosaic" (pp. 318–319). CHI '95 Mosaic of Creativity, Denver, CO.
Albers, Michael C., Bergman, Eric. "The Auditory Web: Auditory Enhancements For WWW Browers." CHI '95 Mosaic of Creativity, Denver, CO.
Albers, Michael C., Bergman, Eric, "The Audible Web." CHI '95 Mosaic of Creativity, Denver, CO.

(List continued on next page.)

*Primary Examiner*—Jack Choules
(74) *Attorney, Agent, or Firm*—Skjerven Morrill MacPherson LLP; Sam Campbell

(57) ABSTRACT

A system for presenting hypermedia link information. A computer-implemented method for presenting hypermedia link information is described which relates to the user the characteristics of a data file pointed to by the hypermedia link. The computer system waits for an event to occur. This event is the user or system selecting one or more hypermedia links. The hypermedia link in this scenario points to a data file about which information is to be gathered. The computer system then requests information about the data file. Finally, an auditory cue is generated to communicate information about said data file to a user. Alternatively, this information may be conveyed to the user by visual means, such as a pop-up information box on the user's display. A powerful and convenient system for browsing hypermedia information is thus provided.

36 Claims, 10 Drawing Sheets

OTHER PUBLICATIONS

Alberts, M. C. "The Varese System, Hybrid Auditory Interfaces, and Satellite–Ground Control: Using Auditory Icons and Sonification in a Complex, Supervisory Control System." Proceedings of the International Conference on Auditory Display '94. Santa Fe, N.M.

Ballas, J. A. (1994). "Delivery of Information through Sound." In G. Kramer (Ed.), Auditory Display: Sonification, Audification, and Auditory Interfaces (pp. 79–94). Reading, MA: Addison–Wesley Publishing Company.

Blattner, M. M., A. L. Papp III, & E. P. Glitnert (1994). "Sonic Enhancement of Two–Dimensional Graphic Displays," In G. Kramer (Ed.), Auditory Display: Sonification, Audiciation, and Auditory Interfaces. Reading, MA: Addison–Wesley Publishing Company.

Gaver, W. (1993). "Synthesizing Auditory Icons." Proceedings of INTERCHI '93 (pp. 228–235). Amersterdam: ACM.

Groff, Jean–Francois & Descombes Jacques, "Untangling the Web." Info Design, Geneva, CH (no date).

Kramer, G. (1994). ".An Introduction to Auditory Display." In G. Kramer (Ed.), Auditory Display: Sonification, Audiciation, and Auditory Interfaces (pp. 1–77). Reading, MA: Addison–Wesley Publishing Company.

Meschkat, S. "Active Articles in Interactive Journals." ART+COM, Berlin, DE (no date).

Mynatt, E. D. "Designing With Auditory Icons." Proceedings of the International Conference on Auditory Display '94. Santa Fe, NM.

Scaletti, C. & Craig, A. (1991). "Using Sound to Extract Meaning from Complex Data." Proceedings of the SPIE, Conference 1459, Extracting Meaning from Complex Data: Processing Display, Interaction II. San Jose: SPIE.

Staten, James, "Newton Beat: Web Client in Development." (Nov. 14, 1994). MacWeek, vol. 8, No. 45, p. 29.

Umstaetter, A., "WWW'94 Demonstration submission: The Ping Project." Hochschule der Kinste, Berlin, DE (no date).

* cited by examiner

PRESENTATION OF LINK INFORMATION AS AN AID TO HYPERMEDIA NAVIGATION

This application claim benefit to provisional application Ser. No. 60/019,052, May 6, 1996. This application claim benefit to provisional application Ser. No. 60/015,249, Apr. 10, 1996.

BACKGROUND OF THE INVENTION

The present invention relates to a system for conveying to a user the characteristics of data files displayed as hypermedia links and to the presentation of content information about such hypermedia links via audible feedback.

Hypermedia is a paradigm for representing information as documents interconnected by "links" (references to other documents or data files). Files so referenced can (and often do) reference other files in the same manner. Using the hypermedia paradigm, large numbers of data files can thus form highly interconnected documents and file systems.

An example of hypermedia's popularity is its use on the Internet. The Internet is an enormous distributed collection of data. Use of the Internet has increased dramatically with the advent of the world-wide web (WWW). The WWW uses hypermedia concepts to allow easier access to this mass of information. In the WWW paradigm, links in a WWW document are represented by Universal Resource Locators (URLs). These URLs give the WWW address of the system (webserver) on which the information (data file) is stored. Other information in the URL includes the data file's name and location on the webserver. Data files referenced in such systems may contain text, digitized audio, digitized video, or other information, or may themselves be executable programs.

Hypermedia and the tools designed to view such information have existed for several years. Unfortunately, many hypermedia tools exhibit known computer-human interface problems. Such tools often give users little or no feedback about the characteristics of the data files referenced by the links which point to the data file's location, the time to obtain that information or the results of ongoing processes.

In many hypermedia systems (e.g., Sun Microsystem's™ WWW browser HotJava™), the manner in which a data file is represented often allows the user to view only the data file's name and location (its URL). Information regarding the data file's size, its file type, the length of time required to download the data file and other information is often unavailable to the user, save for actually downloading the file. Such information is only available if it is included in the hypermedia page on which the data file's URL is displayed. This places the onus of providing such information on the party maintaining the WWW site. Moreover, dynamic information such as the download time cannot be hard-coded. This is because such information is not deterministic and depends upon a variety of variables such as the current load on the webserver, the current load on the network, and the network distance between the client and webserver. Thus, many WWW sites do not and, in some respects, cannot provide such information. These URL's may represent data files residing on webservers far removed from the system on which the browser resides. This is true not only for the WWW, but for any widely-distributed network-based hypermedia browsing environment. Unfortunately, a webserver's operator has no transparent method of indicating such information (especially dynamic information such as download time) to a user operating a hypermedia browser.

While visual cues may be used to relay this information to the user, the highly visual task of searching for the desired links in a hypermedia display reduces the visual bandwidth available for acquiring information regarding each link's characteristics. Visual enhancements which provide more information may compound the problem by forcing additional cognitive loads on the user. In addition, there are situations when graphical information display may be inappropriate or invasive. For example, visual cues notifying a user about progress, completion or errors tend to distract the user from the (primarily visual) task which they are currently performing.

Accordingly, it is desirable and important to efficiently provide information on hypermedia links without forcing the user to actually download the information represented by those links. Further, it is desirable to provide such information and information regarding the hypermedia browser's operations in a manner which minimizes interference with the user's operation of the computer system and even further engages the user in the operation of the hypermedia browser.

SUMMARY OF THE INVENTION

By virtue of the present invention, a system is provided for conveying to a user the characteristics of data files displayed as hypermedia links and for the presentation of content information about such hypermedia links via audible feedback.

In one embodiment, a computer-implemented method for presenting hypermedia link information is provided which communicates to the user the characteristics of a data file to which the hypermedia link points. The computer system waits for one or more hypermedia links to be selected. The hypermedia link in this scenario points to a data file about which information is to be gathered. The computer system then requests information about the data file. Finally, a cue is generated to communicate information about said data file to a user. This cue may be an auditory cue (e.g., a piano note with a pitch related to the data file's relative size) or a visual cue (e.g., a pop-up information box on the user's display).

In another embodiment, a computer-implemented method for presenting hypermedia link information is provided in which selected links in a hypermedia document (e.g., all the links on the page currently displayed) are examined. The characteristics of each link are then returned to the user. The process begins by having the computer retrieve a hypermedia page. The computer system then retrieves information about each file (or a pre-selected set of files) represented by a hypermedia link on the hypermedia page. This is done by generating an information request, sending the information request to a computer system on which the data file resides, receiving the information, and processing the information. The information received is then communicated to the user.

A further understanding of the nature and advantages of the inventions herein may be realized by reference to the remaining portions of the specification and the attached drawings.

DESCRIPTION OF SPECIFIC EMBODIMENTS

Figure 1:
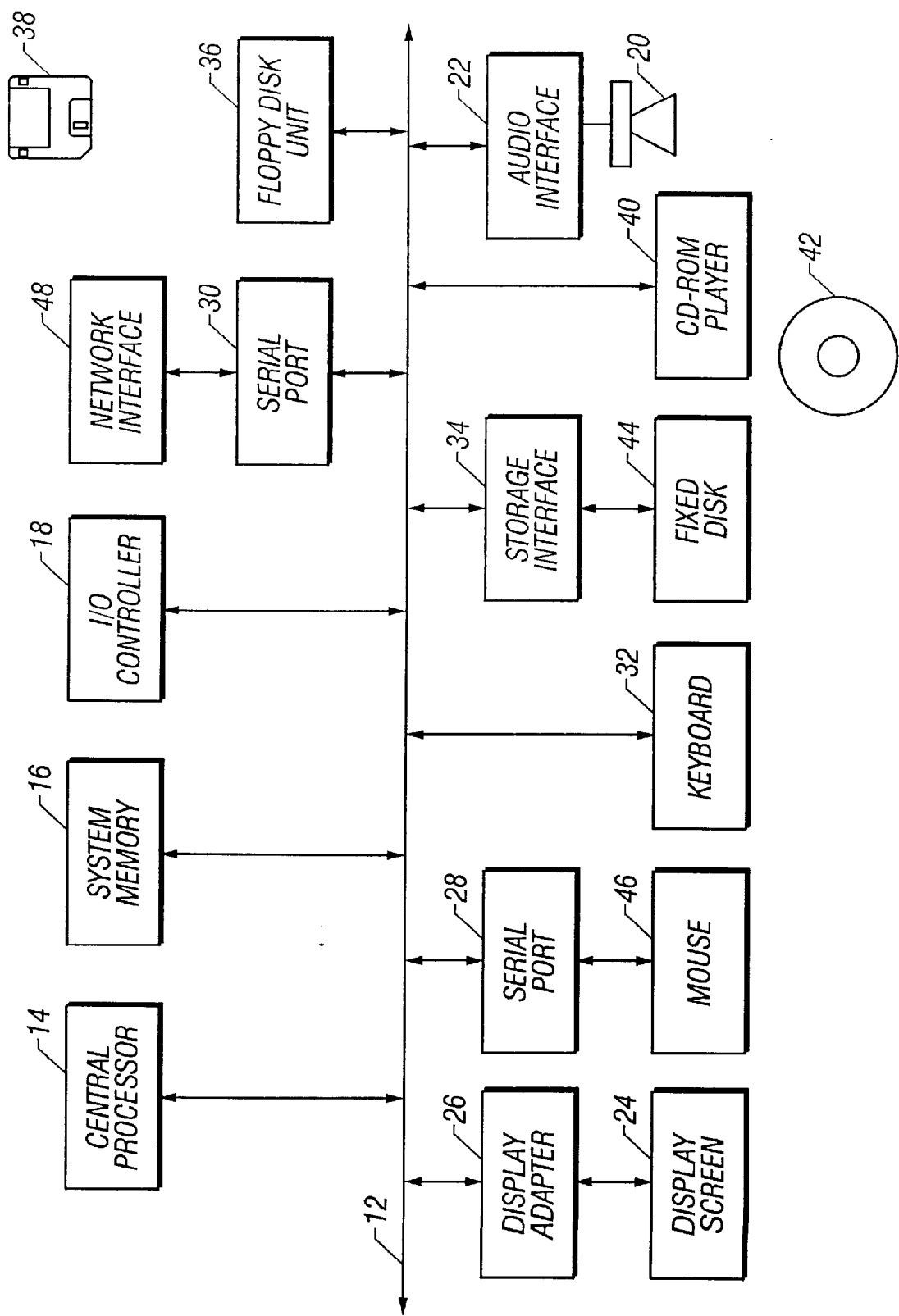
FIG. 1 depicts a block diagram of a host computer system suitable for implementing the present invention.

FIG. 1 depicts a block diagram of a host computer system 10 suitable for implementing the present invention. Host computer system 10 includes a bus 12 which interconnects major subsystems such as a central processor 14, a system memory 16 (typically RAM), an input/output controller 18, an external audio device such as a speaker system 20 via an audio output interface 22, an external device such as a display screen 24 via display adapter 26, serial ports 28 and 30, a keyboard 32, a storage interface 34, a floppy disk drive 36 operative to receive a floppy disk 38, and a CD-ROM player 40 operative to receive a CD-ROM 42. Storage interface 34 may connect to a fixed disk drive 44. Fixed disk drive 44 may be a part of host computer system 10 or may be separate and accessed through other interface systems. Many other devices can be connected such as a mouse 46 connected via serial port 28 and a network interface 48 connected via serial port 30. Network interface 48 may provide a direct connection to a remote server via a telephone link or to the Internet via a POP (point of presence). Many other devices or subsystems (not shown) may be connected in a similar manner.

Also, it is not necessary for all of the devices shown in FIG. 1 to be present to practice the present invention. The devices and subsystems may be interconnected in different ways from that shown in FIG. 1. The operation of a computer system such as that shown in FIG. 1 is readily known in the art and is not discussed in detail in this application. Code to implement the present invention may be operably disposed or stored in computer-readable storage media such as one or more of system memory 16, fixed disk 44, CD-ROM 42, or floppy disk 38.

Figure 2:
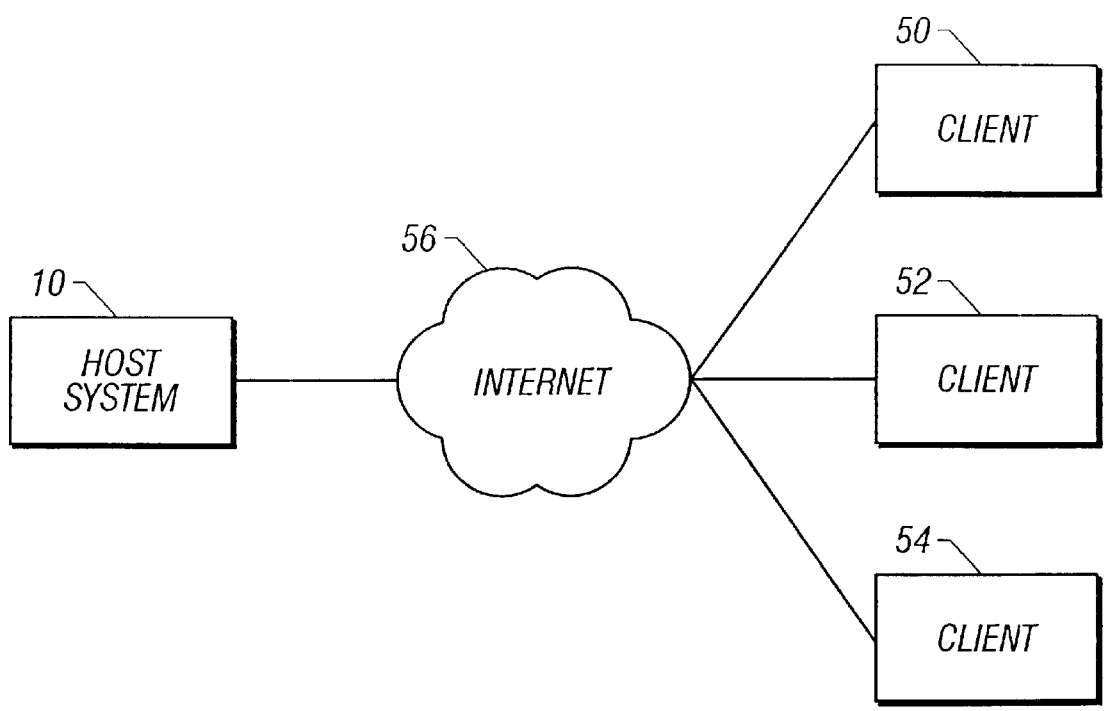
FIG. 2 depicts the interconnection of the host computer system to remote clients.

FIG. 2 depicts the interconnection of host computer system 10 to client systems 50, 52, and 54. FIG. 2 depicts the Internet 56 interconnecting client systems 50, 52, and 54. Modem 48 or some other network interface provides the connection from host computer system 10 to the Internet 56. Protocols for exchanging data via the Internet are well known to those skilled in the art. Although FIG. 2 depicts the use of the Internet for exchanging data, the present invention is not limited to the Internet or any network-based environment.

Figure 3:
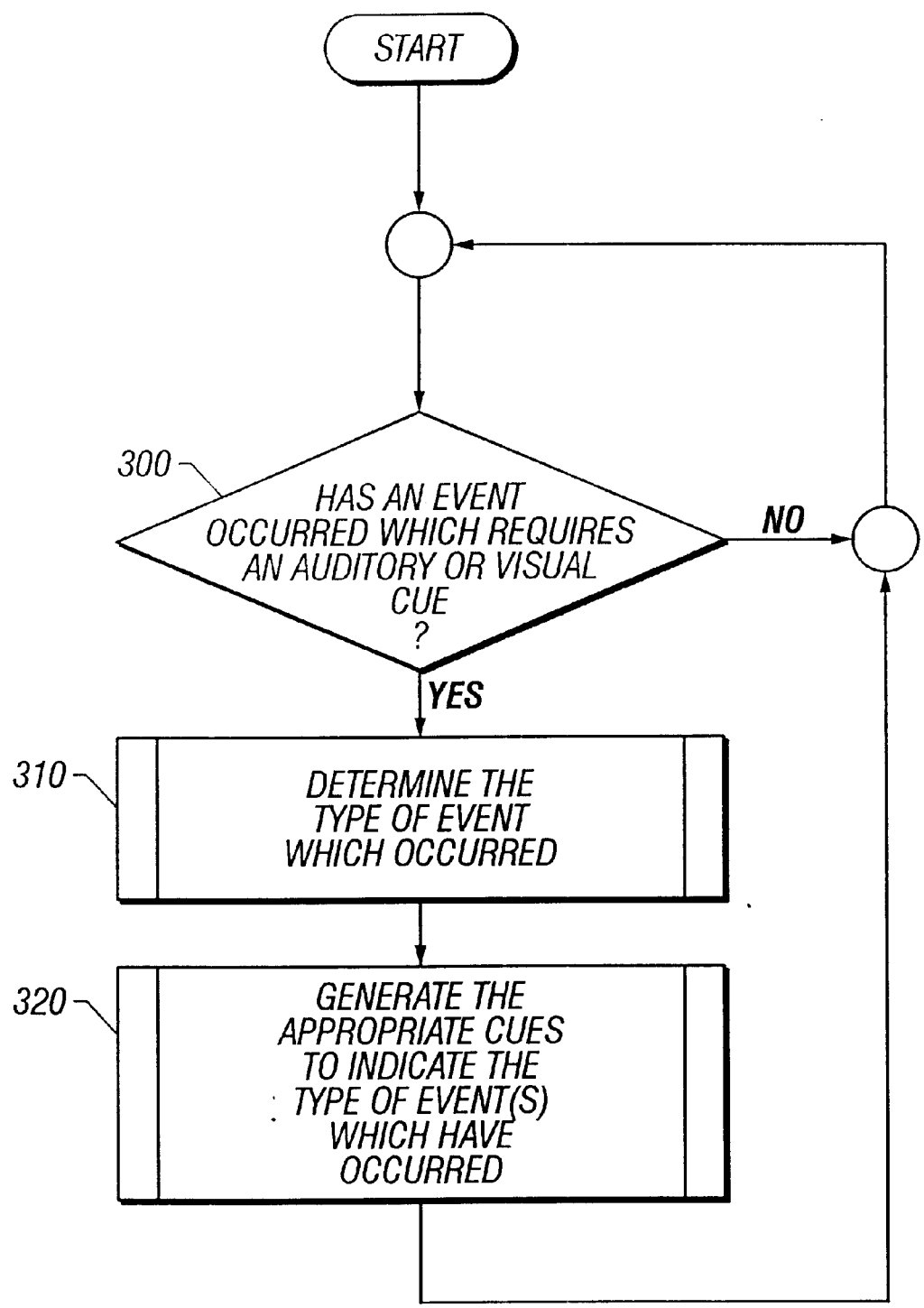
FIG. 3 is a flowchart describing the steps of generating an auditory or visual cue based on an event according to one embodiment of the present invention.

In one embodiment of the present invention, an auditory or visual cue is generated to indicate that a user or system action has occurred, or that the system has responded in some way. This is illustrated by the flowchart shown in FIG. 3. At step 300, the system waits for an action or event to occur in the hypermedia browser system that requires the generation of some type of cue. If no action has occurred that requires a cue, the system simply continues to wait. If the user has taken an action or a system event has occurred (e.g., a file transfer has completed) that requires a cue, the system determines the type of action taken or the type of event that occurred in step 310. At step 320, the system generates an appropriate auditory or visual cue (or cues) to indicate the type of action or event that has occurred. A visual or audible indication of the action or event may be provided to the user to indicate to the user that the action or event has occurred. However, the use of auditory cues has applicability in situations such as a windowed operating environment where the program has been iconified.

Communicating such information to the user by generating auditory cues provides several other advantages. Auditory cues are particularly useful for enhancing hypermedia tools because such tools exhibit known computer-human interface problems: users get little or no feedback about the size and content of information referenced by links, time to obtain that information, and the results of ongoing processes. By using audible rather than visual enhancements, more information may be provided to the user while shifting the additional cognitive load to a different modality.

Auditory cues are preferable when they complement visual interfaces by increasing a user's sense of engagement, enhancing monitoring of background processes, and reinforcing visually represented information. In addition, there are situations when graphical information display may be inappropriate or invasive. For ongoing processes such as file transfer, auditory cues can notify users about progress, completion, and errors without distracting them from the visual task currently being performed. Such a system is described in the WWW documents presented as Section B in this application. The URLs of these documents exist at http://www.isye.gatech.edu under the pathnames:

1) /chmsr/Mike_Albers/papers/WWW/WWW_AW.html

2) /chmsr/Mike_Albers/projects/AW/AudibleWeb.html

3) /chmsr/Mike_Albers/papers/CHI95/CHI_AW_sp.html (These URLs were valid as of May 31, 1996.) However, while auditory cues may provide certain benefits, visual cues may also be used to present information gathered by the method of the present invention from sites storing hypermedia information and data files.

In one configuration of this embodiment, host computer system 10 has access to a hypermedia document stored locally. For example, this document may be stored on fixed disk drive 44 (if the drive is local) and accessed via storage interface 34. The document may also reside on floppy disk 38, CD-ROM 42 or other computer readable media.

In another configuration of this embodiment, the hypermedia document is stored on a remote computer system. In FIG. 2, for example, remote computer systems storing such documents are represented by clients 50, 52 and 54. Host computer system 10 is able to display hypermedia information (using display screen 24, for example) from several such clients. This is the case for WWW applications, where a hypertext transfer protocol (HTTP) server (webserver) operates on host computer system 10 and the hypermedia files reside on other (remote) computer systems. These files are typically in hypertext markup language (HTML) format, which is commonly readable by most commercially available WWW browsers. An explanation of HTML format for encoding hypermedia documents on the WWW is found in Morris, *HTML for Fun and Profit,* (SunSoft Press 1995), the contents of which are herein expressly incorporated by reference for all purposes.

A hypermedia document typically includes many pages. Often, each such document is stored in a separate file. A given hypermedia document will have links which point to various data files, which often will exist on one or more remote WWW servers. Client systems 50, 52, and 54 are configured to operate as webservers. A hypermedia browser running on host computer system 10 can access client systems 50, 52, and 54 as WWW sites over the Internet 18.

Figure 4:
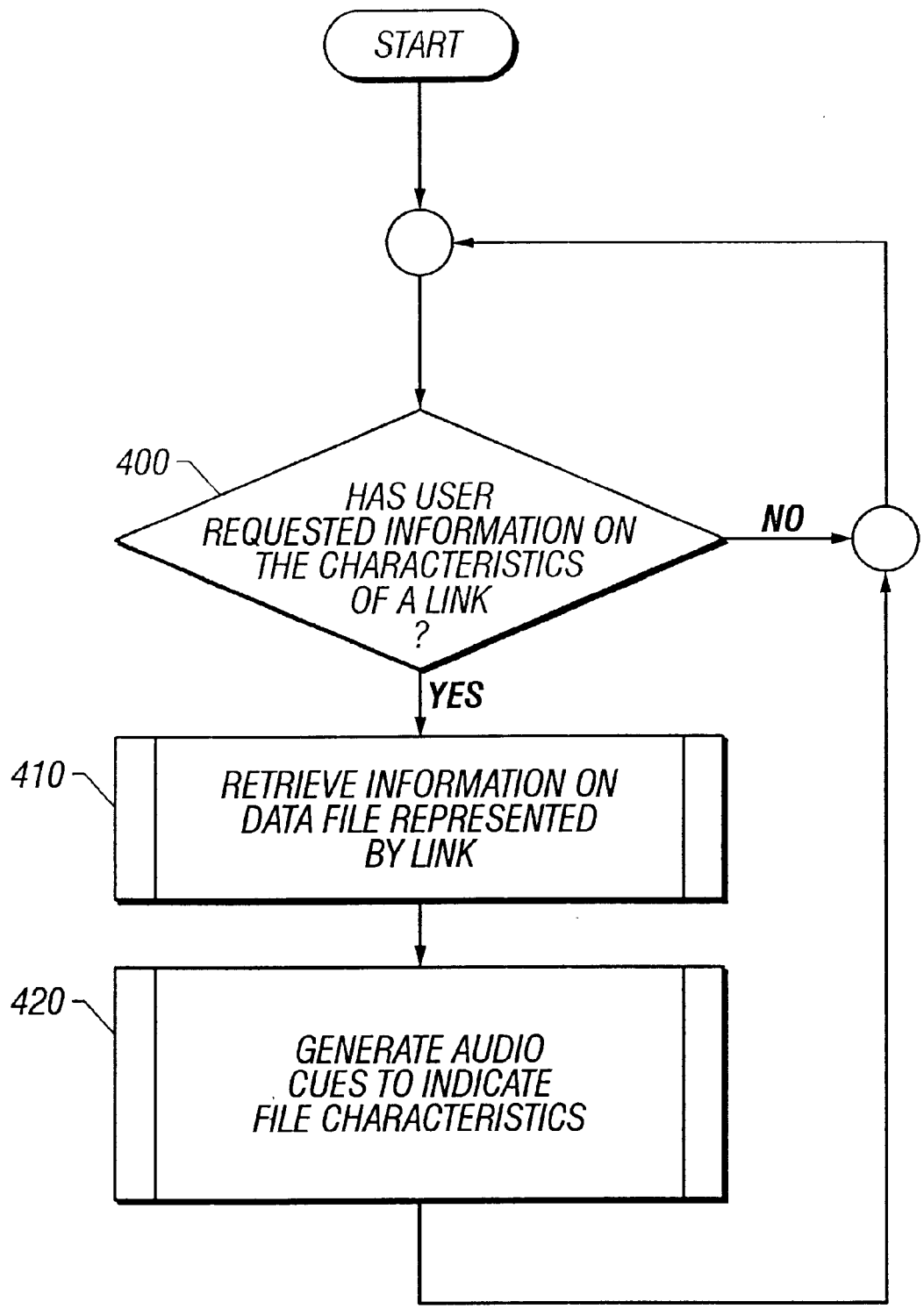
FIG. 4 is a flowchart describing the steps of generating an auditory cue based on information about a hypermedia link according to one embodiment of the present invention.

An example of this approach is illustrated in FIG. 4, which shows the steps taken in providing information about hypermedia links represented by WWW universal resource locators (URLs). FIG. 4 is a flowchart describing steps of indicating to the user the characteristics of a data file pointed to by a URL. At step 400, the browser waits for the user to request information on the characteristics of a URL. Once the user has made this request, the system requests information about the data file represented by the link at step 410. At step 420, the system receives the information and generates an cue (audible or visual) to indicate to the user the characteristics of the data file.

Figure 5:
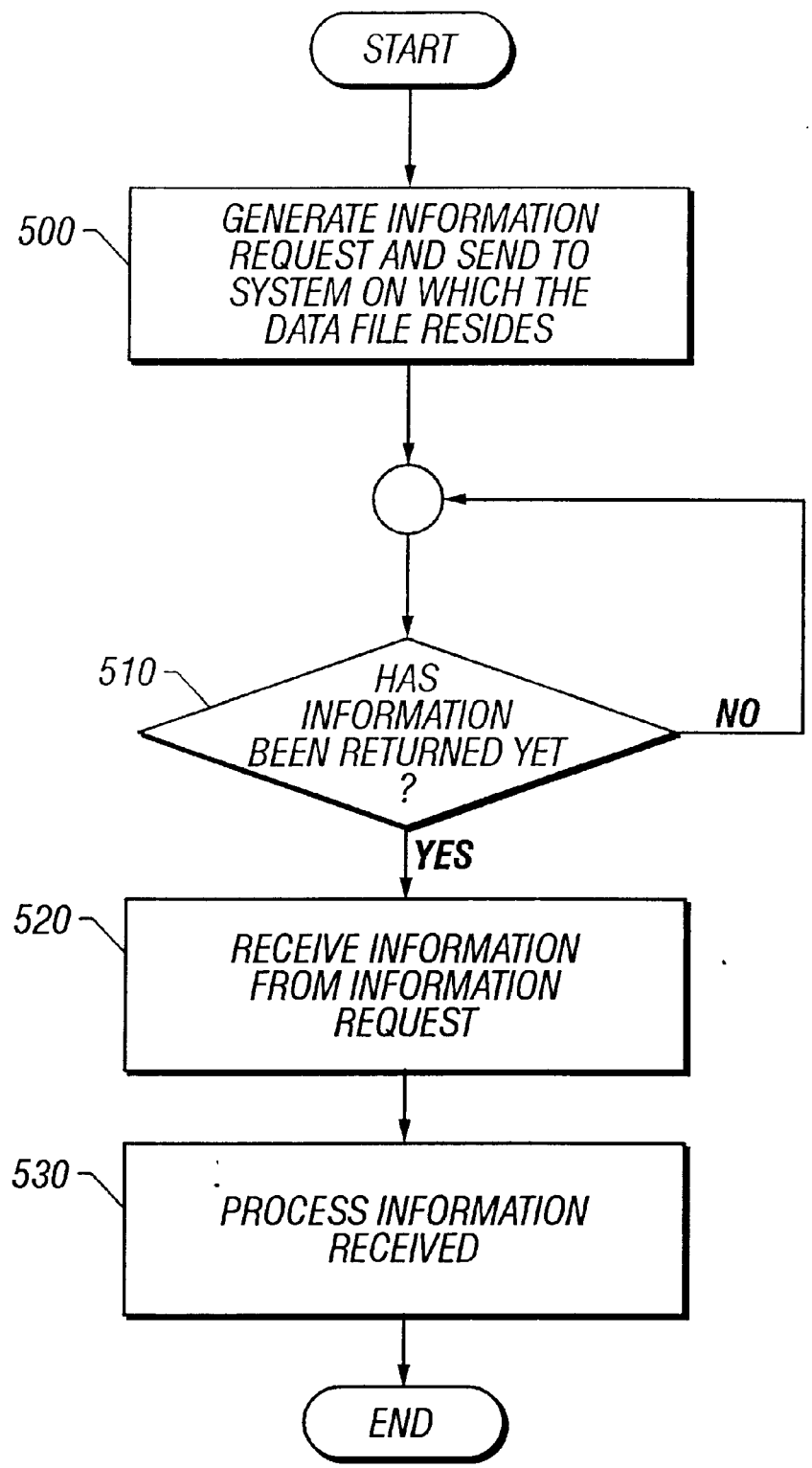
FIG. 5 is a flowchart describing the steps of retrieving information about a hypermedia link according to one embodiment of the present invention.

The system requests information on the data file represented by the link in the manner shown in FIG. 5. At step 500, the system generates an information request and sends this information request to the system on which the data file resides. In the case of hypermedia documents on the WWW, the system retrieves this information by performing an httpd HEAD request (httpd is the program which handles hypermedia access requests when using the WWW). This request is similar to the request usually made to retrieve the hypermedia document to which the link points. However, instead of retrieving the entire hypermedia document, only basic information stored in the hypermedia document's header is returned. This saves the user the time and resources that actually downloading the hypermedia file would entail, thus reducing network traffic.

In an organization, the more WWW users employing the method of the present invention, the greater will be the reduction in network usage. This is because, often, only the basic hypermedia document information will need to be transferred, rather than the entire hypermedia document. Furthermore, the HEAD request is a standard feature of HTTP. HTTP-compliant webservers thus require no modification to support information retrieval by the method of the present invention. At step 510, the system waits for the information regarding the data file to be returned. Once the information is returned, the system receives this information from its information request at step 520. At step 530, the system processes the information received. This processing generally takes the form of parsing the information to collect the particular information which has been requested.

Information about the file may be presented as an auditory cue (i.e., one or more sounds which conveys the information to the user). When one or more links are selected, the method of the present invention can provide an auditory cue which conveys information regarding the corresponding file (or files). The file's type may be represented by sounds such as:

the sound of a typewriter, representing a text file;

the sound of a camera shutter, representing a graphics file;

the sound of a running 8 mm projector, representing a video file; and the sound of a tune on a piano, representing an audio file. An approximation of the file's relative size may be represented by a piano note. The note's pitch can then be varied according to the file's size, with higher notes representing successively smaller files. This is a relative measurement, in that a pitch indicating a given file size will be generated with regard to the file's type. Thus, for example, for two files of different types (e.g., a video file and a text file) with notes having the same pitch, the files will differ in actual size (the video file will be larger than the corresponding text file).

Figure 6:
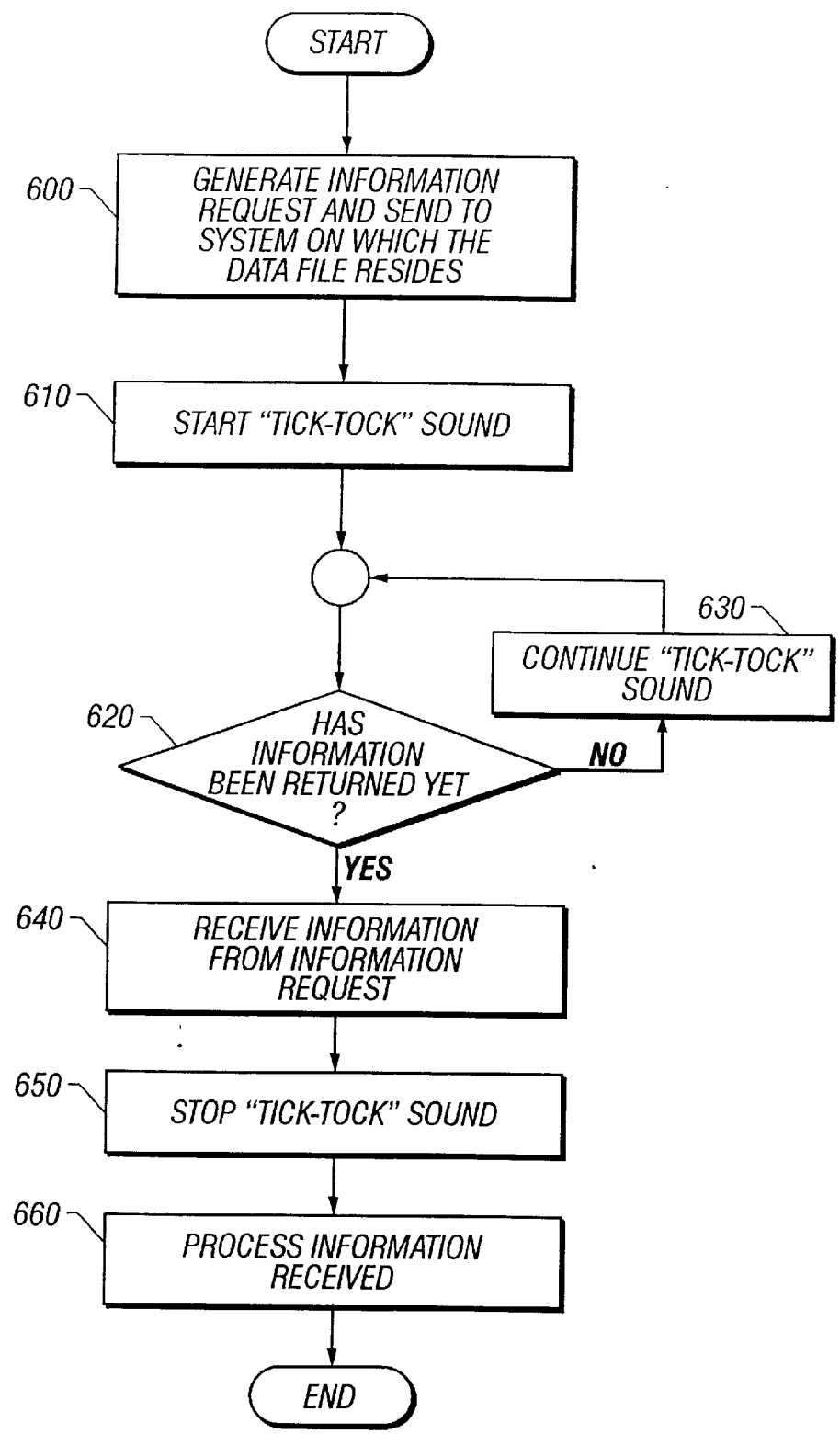
FIG. 6 is a flowchart describing the steps of retrieving information about a hypermedia link according to a further embodiment of the present invention.

FIG. 6 illustrates a method which also provides audible feedback to the user indicating the length of time required to retrieve the data file represented by the URL. At step 600, an information request is generated and sent to the system on which the data file of interest resides. This is the data file which is represented by the URL which appears on the hypermedia page currently being viewed. At step 610, a "tick-tock" sound is begun, which will continue until the file has been successfully retrieved or an error condition occurs. At step 620, the system waits for the information to be returned. At step 630, if no information has yet been returned, the system continues to produce the "tick-tock" sound, indicating to the user an approximation of the relative time which will be required to retrieve the data file. Once the information on the data file has been returned, the system receives the information requested at step 640. At step 650, the "tick-tock" sound ceases, indicating that the transfer of data file information is complete.

The duration of the "tick-tock" sound presents a relative measure of the time required for information to travel between the user's system and the system on which the data file resides, a longer the duration signifying an equally longer download time. Thus, the user can only make a relative estimate of download time from the auditory cue's duration. For example, if a cue lasts 10 seconds while retrieving file information from one location and 5 seconds while retrieving identical file information from a second location, the user can expect that the download time for the first system's file will be about twice that for the second system's. Moreover, this measurement reflects not only static parameters such as the distance between the user's system and the remote system and the data file's size, but also reflects dynamic characteristics such as the current level of network traffic. This dynamic indication of the time required to retrieve the data file allows the user to decide if the time required is acceptable, or whether it would be best to wait (e.g., until there is less network traffic). At step 660, the information received is again processed. During this processing, the information received is parsed into its various components.

Figure 7:
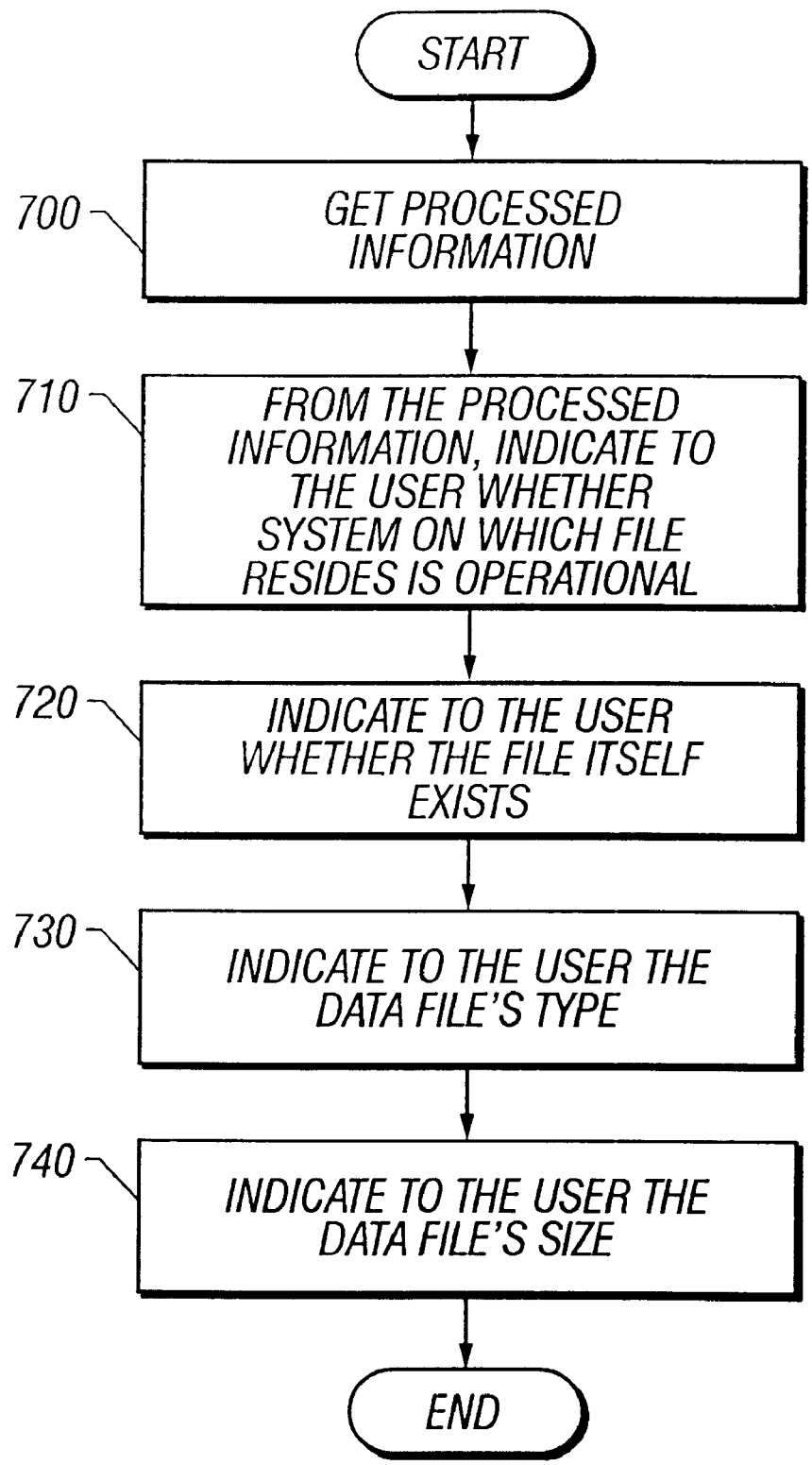
FIG. 7 is a flowchart describing the steps of processing information about a hypermedia link according to one embodiment of the present invention.

This processing is illustrated in FIG. 7. At step 700, the information to be processed is retrieved from the system. From the processed information the system indicates to the user whether the system on which the data file resides is operational at step 710. At step 720, the system indicates to the user whether the file about which information was requested exists on the remote system. Also indicated to the user are the data file's type at step 730 and the data file's size at step 740. This and similar information may be provided to the user in the form of auditory cues, but may also be provided by employing visual cues. For example, visual cues might be in the form of a pop-up window which would present information such as the condition of network traffic between the user's site and the webserver on which the data file resides. Changes in color, graphical indications and other methods might also be employed.

Figure 8:
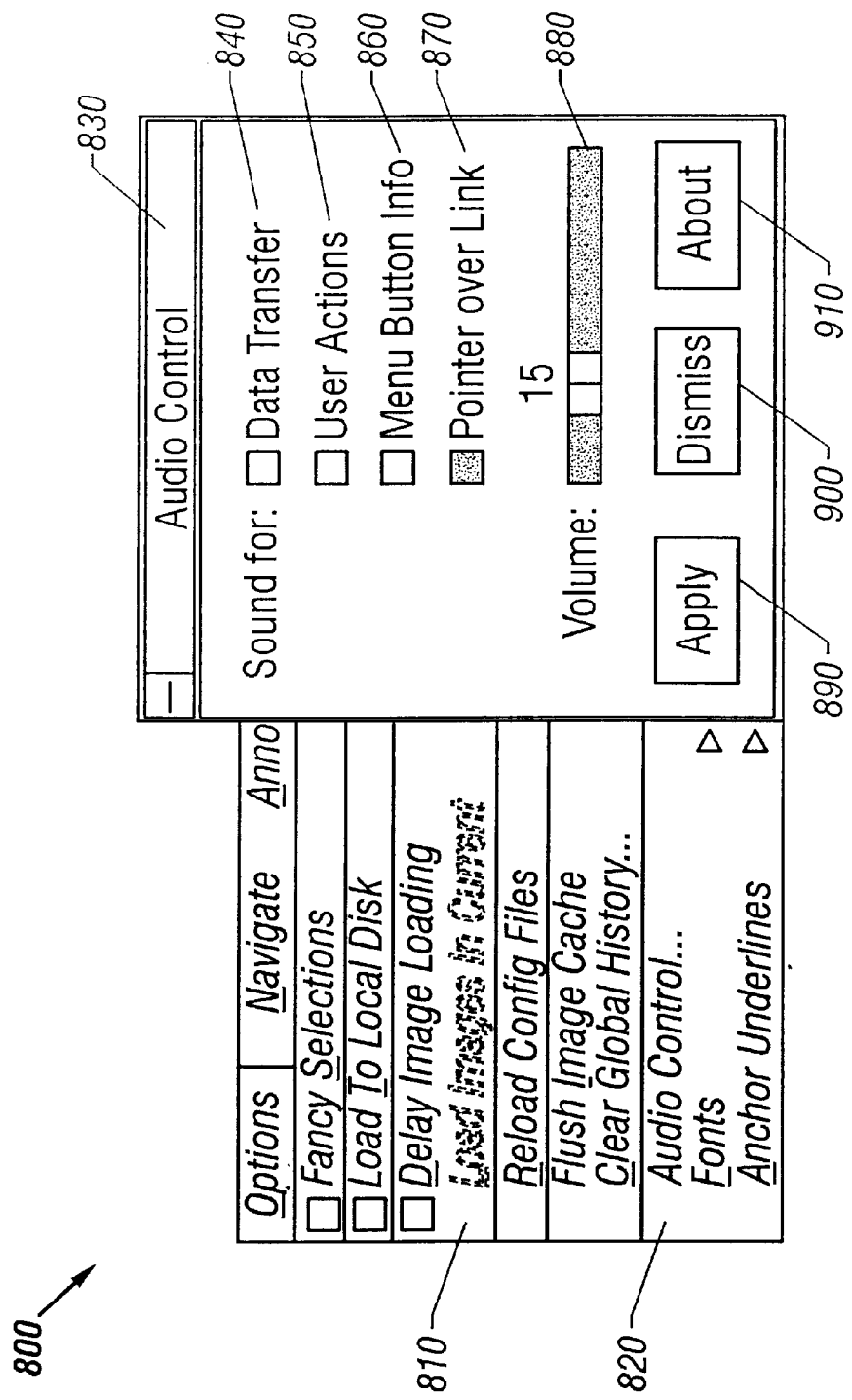
FIG. 8 depicts a menu system for configuring audible feedback according to one embodiment of the present invention.

FIG. 8 illustrates the menus which are used to control the auditory cues used in the preferred embodiment of the present invention. The user selects options 800 from a menu on a WWW browser. This brings up the options menu 18.

The user selects an audio control 820 to bring up an audio control menu 830. The user may then make several selections to control the feedback of information via auditory cues.

A data transfer selection 840 controls auditory cues generated during the transfer of data. When this option is "on," auditory cues are played after selection of a link to another data file. Background sounds are played that give an indication of the progress of the data transfer.

A user actions selection 850 controls auditory cue generation relating to user actions. When this option is "on," auditory cues are generated when various actions are taken by the user. For example, buttons clicks and menu selections may cause sounds to be made when user actions selection 850 is selected.

A menu button information selection 860 allows the user to control whether information is gathered about a specific link. When this option is "on," users may request info about a URL (e.g., a link) by using the "menu button" (the right mouse button, for example). When the cursor is positioned over a link and the menu button depressed, information regarding the URL's relative network distance from the user is given (using the previously mentioned auditory cue), along with the type of data file pointed to by the URL, the relative size of the data file and other information.

A pointer over link selection 870 controls audio generation when the cursor is positioned over a link. When this option is 'on' and the user positions the cursor over a link, auditory cues are generated which communicate file information regarding the data file represented by the link. For example, if the link's URL specifies a text file, then the auditory cue representing a text file is generated. These actions are not based on whether the data file actually exists, but on the information returned by the remote system. Menu button information selection 860 checks for the existence of the data file at the end of a link, which pointer over link selection 870 does not. A volume control 880 controls the volume of the auditory cues which are generated.

Figure 9:
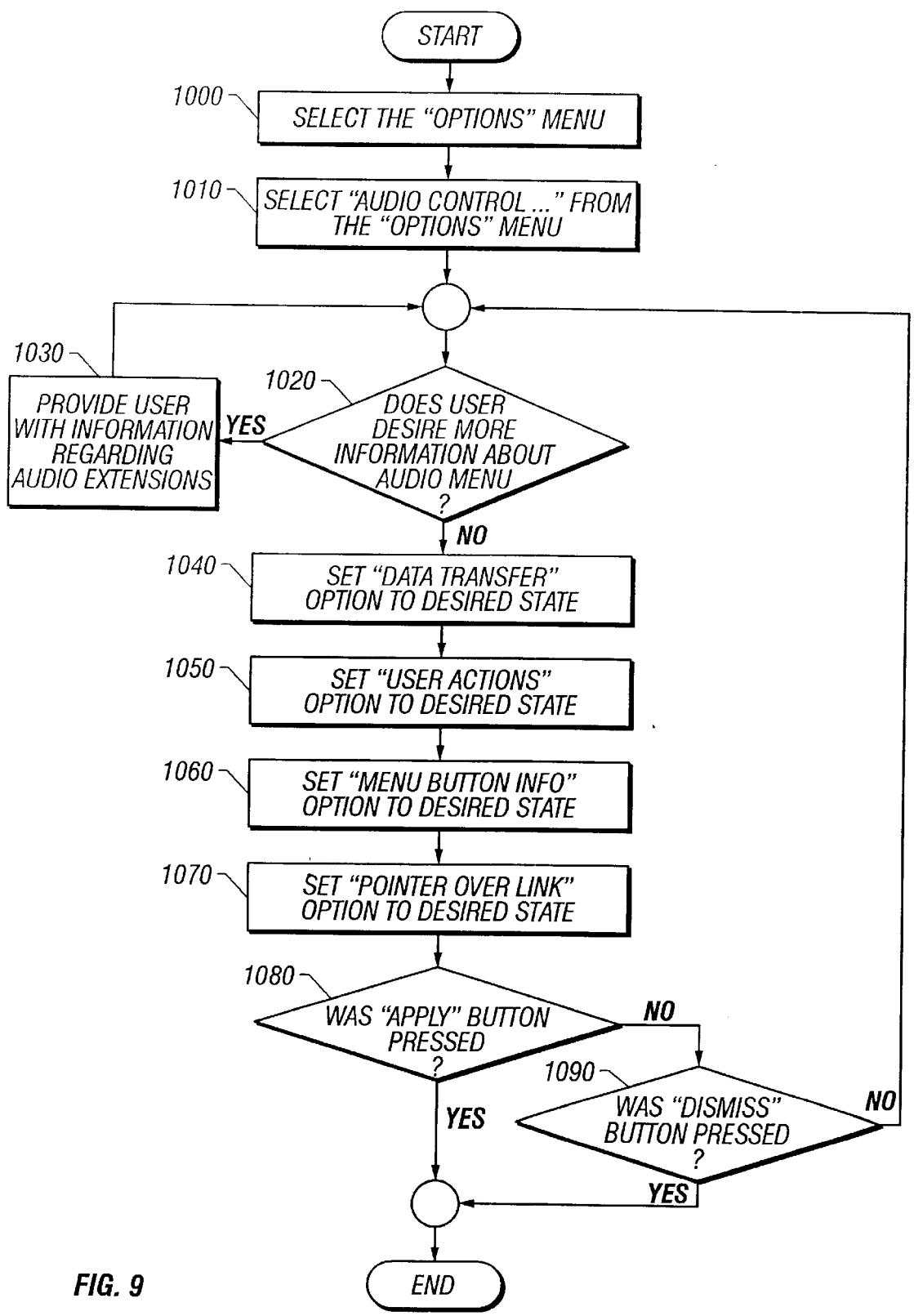
FIG. 9 is a flowchart describing the steps of configuring audible feedback according to one embodiment of the present invention.

In FIG. 9, a process is shown for the use of the audio control menu illustrated in FIG. 8. The process begins at step 1000 by the user selecting the "Options" selection from a main menu (not shown). At step 1010, the user selects "Audio Control . . ." from the options menu. At this point (step 1020), the user decides whether more information is desired about the audio menu. If more information is desired about the audio menu, the user is provided with information regarding audio extensions at step 1030. The user indicates that such information is desired by clicking on the "About" button. If no information is desired about the audio menu, the user may set several different parameters to configure the system to provide auditory cues.

At step 1040, the user may set the "Data Transfer" option to the state desired by the user. At step 1050, the user may set the "User Actions" option to the desired state. At step 1060, the user may set the "Menu Button Info" option to the desired state. At step 1070, the user may set the "Pointer Over Link" option to the desired state. The selections made by the user are then either implemented or the menu is dismissed without making the indicated changes in configuration (if any).

At step 1080, the system determines whether the "Apply" button was pressed by the user. If the "Apply" button was clicked on by the user, the changes indicated by the user on the menu are implemented. If the "Apply" button was not clicked on by the user, the system determines whether the user clicked on the "Dismiss" button. If either the "Apply" button was pressed or the "Dismiss" button was pressed, the audio control menu is dismissed. If the dismiss button was pressed, the changes indicated by the user on the audio control menu are not implemented. If neither button was pressed, the process continues at step 1020. This process continues to loop until the user indicates that the selections made are or are not to be applied, and that the menu is to be dismissed.

Figure 10:
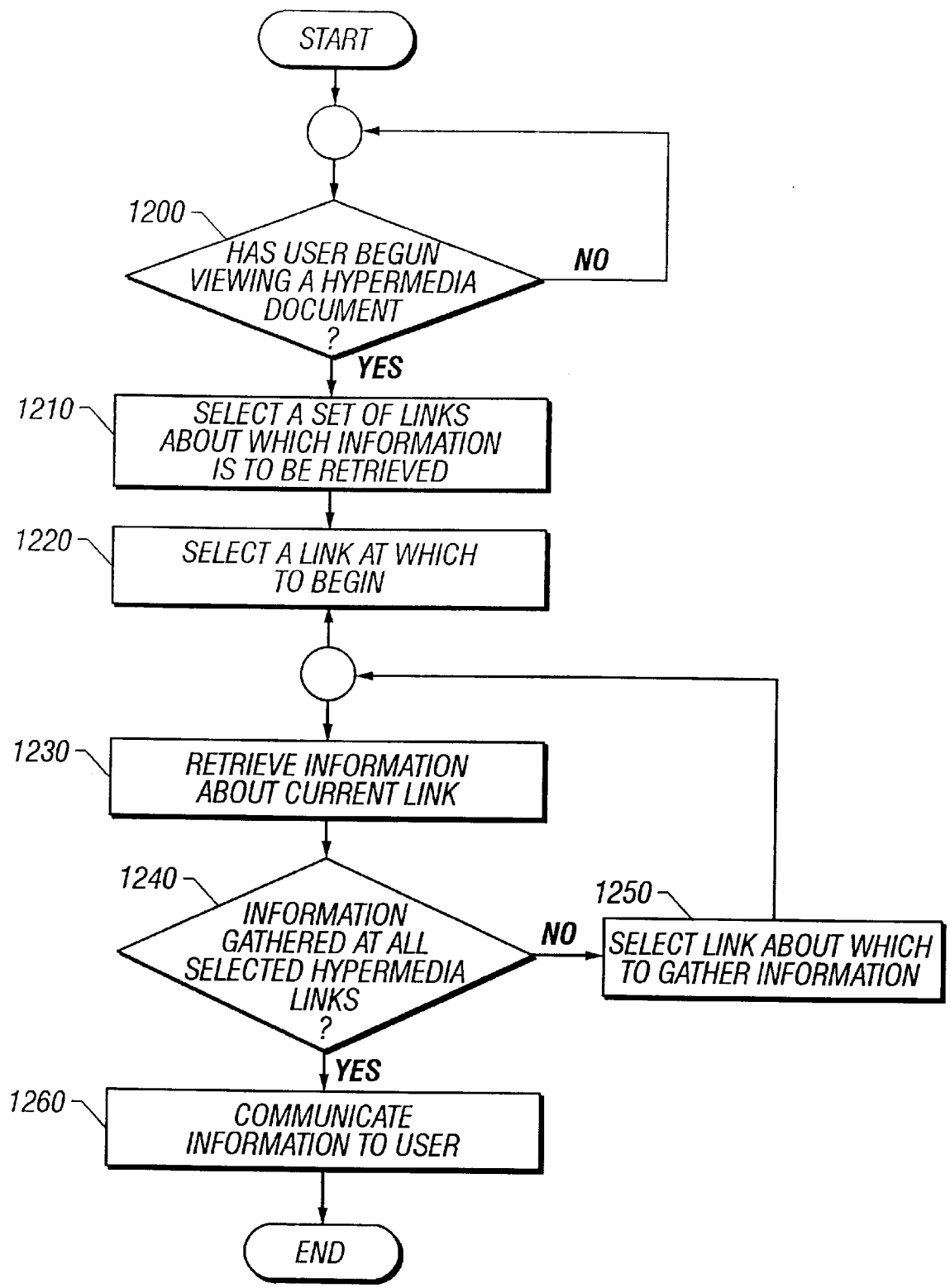
FIG. 10 is a flowchart describing the steps of generating an auditory cue based on information about all the hypermedia links in a hypermedia document according to one embodiment of the present invention.

FIG. 10 illustrates another embodiment of the present invention. In this embodiment, hypermedia links in a preselected portion of a hypermedia document (e.g., the hypermedia document being viewed) are examined. Information regarding these links is then presented to the user. For example, information may be gathered as to the links in the currently-displayed portion of the hypermedia document. This process begins at step 1200, which waits for a user to begin viewing the hypermedia document about which information is to be gathered. Once the user begins viewing such a document, the system selects a set of links in that hypermedia document. For example, the selection process may be controlled by user selection or predefined parameters, or the system may simply select all links currently displayed.

At step 1220, the system selects the first link to be examined. At step 1230, the system retrieves information such as relative download time, file type and file size of the selected link. At step 1240, the system determines whether information has been gathered about all the hypermedia links which were selected. If hypermedia links remain which have not been examined, the system selects the next link about which information is to be gathered at step 1250. At step 1260, if all selected links have been examined, the information gathered for each link in step 1230 is communicated to the user. This communication may take several forms, among them visual representations, auditory cues or a mixture thereof.

In the foregoing specification, the invention has been described with reference to specific exemplary embodiments thereof. It will, however, be evident that various modifications and changes may be made thereunto without departing from the broader spirit and scope of the invention as set forth in the appended claims.

Furthermore, the flowcharts described herein are illustrative of merely the broad logical flow of steps to achieve a method of the present invention and that steps may be added to, or taken away from the flowchart without departing from the scope of the invention. Further, the order of execution of steps in the flowcharts may be changed without departing from the scope of the invention. Additional considerations in implementing the method described by the flowchart may dictate changes in the selection and order of steps.

In general, the flowcharts in this specification include one or more steps performed by software routines executing in a computer system. The routines may be implemented by any means as is known in the art. For example, any number of computer programming languages, such as Java, "C", Pascal, FORTRAN, assembly language, etc., may be used. Further, various programming approaches such as procedural, object oriented or artificial intelligence techniques may be employed.

Many such changes or modifications will be readily apparent to one of ordinary skill in the art. For example, although the described embodiments refer to operation in the context of a network, the present invention will also find application when hypermedia documents are stored and viewed on the same system. Even when implemented in the network context, the present invention is not limited to the WWW, or to HTML documents. The specification and drawings are, accordingly, to be regarded in an illustrative rather than a restrictive sense, the invention being limited only by the provided claims and their full scope of equivalents.

SECTION B

I. The Audible Web

Auditory Enhancements for WWW Browsers

Michael C. Albers

Georgia Institute of Technology

765 Ferst Drive

Atlanta, Ga. 30332-0205, USA

+1 (404) 894-4318 malber@chmsr.isye.gatech.edu http://isye.gatech.edu/chmsr/Mike_Albers/Mike_Albers.html Eric Bergman Sunsoft 25 Garcia Ave., MTV 21-225

Mountain View, Calif. 94043-1100, USA

+1 (415) 336-5930 eric.bergman@eng.sun.com

Abstract

The Audible Web, NCSA's Mosaic with auditory enhancements, aids users' monitoring of data transfer processes, provides feedback for user actions, and provides feedback about links to aid users' navigation of the World-Wide Web. Though The Audible Web is an enhanced version of Mosaic, these enhancements could be employed in any current and future WWW browsers. While these enhancements could have been provided visually, The Audible Web provides application-wide auditory feedback to convey information to users without distracting them from the primarily visual task of navigating, viewing, and obtaining information from the WWW.

Keywords

Human-Computer Interaction, Auditory Interfaces, WWW Browsers, NCSA's Mosaic, The Audible Web.

Introduction

The Internet and the World-Wide Web (WWW) are enormous distributed collections of data whose use has increased dramatically with the advent of NCSA's Mosaic, a graphical information browsing, viewing, and retrieval tool. The popularity of a simple graphical user interface (GUI) for navigating, viewing, and obtaining information from the Internet should come as no surprise. These graphical, point-and-click interfaces offer an appealing alternative to command-line interfaces for users wanting to navigate, view, and retrieve data. In spite of the popularity of these WWW browsers, studies have found usability problems in their user interfaces, especially with regards to feedback, terminology, and adherence to GUI guidelines [EDE94; GR094]. This paper reports on a preliminary investigation of auditory feedback as one approach to enhancing WWW browsers in these areas [1]. The Audible Web is Mosaic [2] embedded with non-speech auditory cues intended to aid users' monitoring of data transfer processes, provide feedback for user actions, and provide feedback about links to aid users' navigation of the WWW. Consideration of the use of sound will precede discussion of these enhancements.

Why Use Sound?

Non-speech auditory cues are a useful complement to a visual interface in many contexts, including situations where:

screen space is minimal, and graphical display of information is invasive or inappropriate.

There is a minimal amount of screen space on a variety of modern computerized environments, including multi-function watches, notebook computers, microwaves, and Personal Digital Assistants (PDAs). PDAs, such as the Apple Newton [3] and Sony's Magic Link which have very little screen space on which to display information, do not have room for multiple pop -up widows. Auditory cues are a useful interface mechanism for conveying information on computers with limited screen space.

There are situations where visual display of information can be invasive or inappropriate. For example, users are often engaged in multiple, visually-oriented tasks at a single time. To effectively manage their visual and mental activities across tasks, users must be allowed to control the focus of their attention. The intrusion of a dialog box or progress bar can interrupt a user's visual and mental activities [BPG94]. Auditory cues, which do not draw the user's visual attention away from other tasks, may a used to notify the user of progress, completion, or errors in an ongoing process instead of visually-invasive progress bars and dialog boxes.

The benefits of adding auditory cues can be a:

perceived increase in the quality of the application, heightened sense of engagement with the application, and reinforcement of visually represented information.

The addition of high quality auditory cues to an interface can result in an increase of the perceived quality of the application [GAV93, KRA94]. Further, with multi-modal interaction, users get a heightened sense of engagement with an application. This heightened engagement can reduce fatigue, decrease learning times, and increase enthusiasm for an application [KRA9]. Also, the addition of sound offers "general computer interfaces, games, and other applications the potential for greater refinement and subtlety" [KRA94].

Realistic auditory cues can also create a greater sense of realism in an application [SCA91]. For example, hearing and seeing two objects collide reinforces the experience and makes it seem more natural. Prove this to yourself by watching a Road Runner or Bugs Bunny cartoon with the sound off or by playing a video game without the sound effects.

Why These Sounds?

When possible, our choice of auditory cues was informed and motivated by the existing literature. Previous research could tells us that non-speech auditory cues are useful for conveying symbolic information, such as file types and user activities, and time-varying information, such as data transfer [ALBip, BAL94, KRA94, MYNip]. Building on Gaver's research on auditory icons, everyday sounds mapped to computer events by analogy with everyday sound-producing events, the sound of a real world event was chosen as the auditory cue (e.g., typewriter for a text file [GAV93]. The sounds chosen that are not "realistic" were picked based on their subjective affordance (e.g., low heavy piano note for large files). All of the sounds used in The Audible Web are presented at low volume levels above background noise in an effort to inform rather than distract users.

Enhancements Provided by Sound

The Audible Web uses auditory cues to enhance user interaction with a WWW browser in three areas. The Audible Web aids user monitoring of data transfer processes, provides feedback for user actions, and provides feedback about links to aid user navigation of the WWW.

Monitoring of Data Transfer Processes

When a user clicks on a hypermedia link, data is transferred from a machine and displayed to the user. In Mosaic, the information provided to the user about this data transfer process are cryptic messages across the bottom of the screen and the spinning globe icon. Any visual feedback that can be provided will be of little help when the user's visual attention is focussed on a separate task. For example, a user may iconify the WWW browser or switch to another 'virtual workspace' to work on a different task during a lengthy data transfer. During this time, the user has no idea if the data transfer is progressing as expected, has completed, or has failed. Because sound is a particularly useful aid for monitoring time-varying processes [ALBip, GAV93, KRA94], The Audible Web provides a series of auditory cues which notify the user of normal and novel events during a data transfer. The three events that cause sounds to be displayed to the user are: the normal progression of a data transfer, opening an external program, and data transfer errors. While the data transfer is progressing normally, users hear low volume clicks and pops [4]. A sliding/opening sound indicates when an external program is opened. If there is an error, users ear the sound of breaking glass. (Please see this table for a complete listing of the auditory cues utilized.)

Because the sequence of sounds displayed to the user is generated based on information gleaned from the data transfer process, the patterns in the data transfer, such as connecting to, requesting, and reading data, can be discerned in the sequence of auditory cues. Here are a few example sequences of auditory cues associated with these different data transfer events:

For the normal data transfer of a file,
For the attempted data transfer of a non-existent file,
For the normal data transfer requiring an external program.

Feedback for User Actions

In current WWW browsers, there is little feedback for user actions such as button presses and menu selections. Ede and Roshak [EDE94] found that many Mosaic users were unsure if the menu items they selected actually performed the action requested. For example, the "Add Current to Hotlist" option in Mosaic, which adds the current document to a database of documents for later retrieval, has no confirmation that the action has occurred, succeeded, or failed.

The Audible Web provides feedback to reinforce user actions via auditory cues for button presses, menu selections, scroll bar movements, and link selections. (Please see this table for a complete listing of the auditory cues utilized). The aim of this auditory feedback is to confirm actions without interrupting visual scanning (as graphical feedback could) and to heighten user engagement with The Audible Web by making sound an expected part of the interaction.

Aid Navigation through Feedback About Links

Whether a Universal Resource Locator (URL) points to a postscript image, to another hypertext document, to an audio clip, or to nowhere, every link looks the same in current WWW browsers. The availability of this information could affect a user's ability to navigate the WWW. But, having little information about the file at this URL location, a user can only click on the hypermedia link and ponder questions such as, "What information will I get?" and "How long will this take?".

There are several technical factors that affect this answer, including: the network "distance" to the machine which provides the file specified by the URL, the current network traffic, the power of a machine providing the file, the size of the file, and whether the file and the machine providing it even exist. Only a technically savvy user is likely to glean any insight from the URL displayed at the bottom of the window.

But why should any user need to decipher a URL? The Audible Web interprets the URL for a user and provides feedback about the probable type of information at this location before the link is activated [5]. As users' move the pointer over different links, The Audible Web provides auditory cues which conveys the file's type, such as:

a typewriter sound for text files,
a camera shutter sound for graphics files,
a running 16 mm projector for video files,
a tune on a piano for audio files, and
some static/modem noise for application files.

(Please see this table for a complete listing of the auditory cues utilized).

The Audible Web also provides information about the other technical factors listed above such as the network "distance" to the machine which provides the file, the current network traffic, the power of the machine providing the file, whether the file and the machine providing it even exist, and the size of the file. When a hypermedia link is selected with the Menu button (the right mouse button for right-handed users), The Audible Web provides information about:
 the relative data transfer time, via the length of time a tick-tock of a clock is played,
 the type and existence of the file, employing the same auditory cues used when the pointer is over the link, and
 the file's approximate size, through a piano note whose pitch varies according to the size of the file.

Alternately, if the file does not exist or the machine that provides the file is not responsive, the sound of breaking glass is displayed instead of the file type and file size cues (the previous two bulleted items).

The tick-tock cue (the relative data transfer time) encapsulates information about the network "distance" to the machine which provides the file, the current network traffic, and the power of the machine providing the file. The file type cue confirms the existence of both the file and the machine providing it while the piano note conveys the size of the file. The sound of breaking glass is displayed if the file does not exist or the machine that provides the file is not responsive. The user can perceive and process this auditory information while continuing to visually scan for other information whereas graphical display of this information could disrupt the users visual scanning.

For example, let's assume that The Audible Web is being employed by a user in San Francisco. She decides to use the functionality of The Audible Web to explore the following links:

A link to a small text file located in Los Angeles.
 When the pointer is over this link, she hears this.
 When she selects this link with the Menu button, she hears this.
A link to a medium-sized audio file located in New York.
 When the pointer is over this link, she hears this.
 When she selects this link with the Menu button, she hears this.
A link to a large graphics file located in the UK.
 When the pointer is over this link, she hears this.
 When she selects this link with the Menu button, she hears this.
A link to an audio file on a non-responsive machine in Australia.
 When the pointer is over this link, she hears this.

When she selects this link with the Menu button, she hears this.

Conclusion

The Audible Web provides enhancements to a WWW browser through the use of auditory cues to aid user monitoring of data transfer in progress, provide feedback for user actions, and provide feedback about links to aid navigation of the WWW. While The Audible Web is an enhanced version of Mosaic utilizing auditory cues, these enhancements could be utilized in future and current WWW browsers, including TkWWW, MidasWWW, ViolaWWW, Netscape, and Mosaic.

While many enhancements can be provided visually, The Audible Web demonstrates the special value of audio for providing information to users without distracting them from a primarily visual task. By providing low level audio feedback for button and menu events as well as link events, The Audible Web presents a ubiquitous audio environment, in which sounds are an expected part of interactions rather than a surprise or salient special event.

Acknowledgments

We would like to thank the members of the human interface groups at SunSoft for their valuable help and support during Mike's summer internship at SunSoft and for the creation of The Audible Web.

References:

[ALBip]
Albers, M. C. (in press). "The Varèse System, Hybrid Auditory Interfaces, and Satellite-Ground Control: Using Auditory Icons and Sonification in a Complex, Supervisory Control System". Proceedings of the International Conference on Auditory Display '94. Santa Fe, N.M.

[BAL94]
Ballas, J. A. (1994). "Delivery of Information Through Sound". In G. Kramer (Ed.), Auditory Display: Sonification, Audification, and Auditory Interfaces (pp 79–94). Reading, Mass.: Addison-Wesley Publishing Company.

[BPG94]
Blattner, M. M., A. L. Papp III, & E. P. Glitnert (1994). "Sonic Enhancement of Two-Dimensional Graphic Displays". In G. Kramer (Ed.), Auditory Display: Sonification, Audification, and Auditory Interfaces. Reading, Mass.: Addison-Wesley Publishing Company.

[EDE94]
Ede, M. & L. Roshak (1994). "Quick Findings for Mosaic Usability Test". (Usability Engineering Report #94-12). Mountain View, Calif.: SunSoft.

[GAV93]
Gaver, W. (1993). "Synthesizing Auditory Icons". Proceedings of INTERCHI '93 (pp 228–235). Amsterdam: ACM.

[GRO94]
Groff, J-F. & J. Descombes (1994). "Untangling the Web". Proceedings of the 1st International Conference on the World-Wide Web. Geneva: http://www1.cern.ch/WWW94/PrelimProcs.html.

[KRA94]
Kramer, G. (1994). "An Introduction to Auditory Display". In G. Kramer (Ed.), Auditory Display: Sonification, Audification, and Auditory Interfaces (pp 1–77). Reading, Mass.: Addison-Wesley Publishing Company.

[MAC94]
"Newton Beat: Web Client in Development". (Nov. 14, 1994). MacWeek, Volume 8 Number 45, p. 29.

[MYNip]
Mynatt, E. D. (in press). "Designing with Auditory Icons". Proceedings of the International Conference on Auditory Display '94. Santa Fe, N.M.

[NEW91]
Newman, W. R., A. Kricker, & B. M. Bove (1991). "Television, Sound, and Viewer Perceptions". Proceedings Joint IEEE and Audio Engineering Society Meeting. Detroit, Mich.

[SCA91 ]
Scaletti, C. & A. Craig (1991). "Using Sound to Extract Meaning from Complex Data". Proceedings of the SPIE, Conference 1459, Extracting Meaning from Complex Data: Processing, Display, Interaction II. San Jose: SPIE.

Endnotes:

[1]
While The Audible Web is an enhanced version of Mosaic utilizing auditory cues, these enhancements could be employed in a broad range of future and current WWW browsers, including TkWWW, MidasWWW, ViolaWWW, Netscape, and Mosaic.

[2]
The Audible Web is NCSA's Mosaic for X Windows, Version 2.4 enhanced with non-speech auditory cues.

[3]
There is a WWW browser in development for the Apple Newton [MAC94].

[4]
These pops and clicks are meant to emulate the pops and clicks heard on the telephone during a long-distance telephone call when it is connecting.

[5]
If the URL specifies a text file that does not exist, The Audible Web still plays the typewriter sound that is associated with text files. When the pointer is positioned over a link, information about the file type is provided based on the URL. The next enhancement, selecting a link with the Menu button, checks for the existence of the file.

Table of Events/Attributes and Auditory Cues

| Event/Attribute | Auditory Cue |
| --- | --- |
| Button Click | Ca-Chick |
| Menu Selection | Click |
| ScrollBar Event | short Pop |
| Link Selection | Bop-Bop |
| Data Transfer | Pops & Clicks |
| Error Condition | Breaking Glass |
| Open External Program | Sliding/Opening |
| Relative Transfer Time | Tick-Tock |
| Text File Type | Typewriter |
| Graphics File Type | Camera Click |
| Video File Type | 16mm Movie Projector |
| Audio File Type | Musical Piano Flourish |
| Application File Type | Static |
| File Size | Piano Notes |

II. The Audible Web

Table of Contents

1. An Introduction to "The Audible Web."
2. A few Papers about "The Audible Web."
3. General Information/What "The Audible Web" tries to show.
4. Activities and Feedback specific to "The Audible Web."

An Introduction to "The Audible Web"

"The Audible Web" was created by Michael C. Albers as a summer intern at SunSoft HCI Engineering during the summer of 1994. "The Audible Web" was built as a demonstration of possible uses of non-speech sound in computer environments. It was also built with the hope that it would have some impact on interface design within SunSoft.

Many thanks go out to:
Members of the HCI Engineering Group
  Eric Bergman, Terre Layton, Karen Bedard, Jim Glenn, Darrell Sano, Don Gentner, Annette Wagner, Maria Capucciati, Elisa Gomez
Members of the CoCo Group
  Tom Rodriguez, John Tang, Trevor Morris, Ellen Isaacs, Alan Ruberg, Rick Levenson
The System Support People
  Chris Kuhar, Jacek Surma, Andy Tran
People @ Gerogia Tech
  Beth Mynatt, Keith Edwards, Ian Smith
People @ Stanford
  Katherine Isbister, Christian Mogensen
Other People
  Jakob Nielsen, Joe Warzecha, Dave Hofert, Martin Hardee, Meghan Ede Without many of these people, The Audible Web (or parts of it) would not have been completed or would not have been as cool as it is.

A few Papers about "The Audible Web"
  CHI '95
  Here's the short paper that was accepted for CHI '95. This is the paper I'd read if you want to know a bit more about The Audible Web without spending a whole bunch of time reading stuff. *Slides,* Video Clip 1, Video Clip 2, Video Clip 3.
  3rd WWW Conference
  Here's the paper that was accepted as a poster/demonstration at the Third International World-Wide Web Conference. The nice thing about this paper is that the sounds used in The Audible Web are embedded in this paper. Unfortunately, I couldn't come up with the money to get to Germany for the conference, so I had to decline their offer to present my work.

General Info/What "The Audible Web" tries to show.

[Please see the papers for a more polished presentation about what I tried to show with The Audible Web. This section predates these papers by many months and is effectively the very rough draft of these papers. Thanks.]

The Internet is an enormous distributed collection of data whose use has increased dramatically with the advent of NCSA's Mosaic, a graphical information browsing and retrieval tool. The popularity of a graphical interface for navigating and obtaining information from the Internet should come as no surprise. However, Mosaic's user interface has a number of deficiencies including cryptic terminology, deviations from established GUI guidelines, and a lack of feedback and feedforward information. "The Audible Web", NCSA's Mosaic for X Windows embedded with auditory cues, is an attempt to address some of these deficiencies in Mosaic by using sound to convey information. The Audible Web uses auditory cues to address three deficiencies with Mosaic's user interface: a lack of feedback for user actions, cryptic information about data transfers, and the lack of information about a link's destination. The Audible Web's auditory cues reinforce user actions, aid users' monitoring of data transfers, and aid users' navigation of the Internet.

Currently, there is little feedback for user actions such as button presses and menu selection. For example, the "Add Current to Hotlist" option adds the currently viewed document to a database of documents for later retrieval. However, there is no visual confirmation that this action has occurred, succeeded, or failed. In addition to action confirmation, feedback also helps heighten the users engagement with the application.

In an attempt to address this lack of feedback for common user actions, The Audible Web provides auditory cues for many user actions including button presses, menu selections, scroll bar movements, dialog box button presses, and link selections. These auditory enhancements ensure that the user knows that a requested action has occurred and heightens the users engagement with The Audible Web.

When a user clicks on a hypertext link, data is gathered from other machines and displayed to the user. Sometimes, this 'data gathering' process can be lengthy. The only information displayed to users are a few cryptic messages across the bottom of the screen and the spinning Mosaic globe icon. However, these visual cues are no help in situations where a user's visual attention is not on the Mosaic window. For example, Mosaic users may minimize Mosaic or switch to another 'virtual workspace' to work on other tasks during long data transfers of large graphic, audio, or video files.

The Audible Web provides a series of auditory cues which notify the user of activity and novel events during data transfers. There are three categories of events that cause sounds to be displayed to the user: error situations in the data transfers, normal data transfers, and opening external programs at the end of data transfers.

From the user's point of view, one serious limitation of Mosaic's hypertext links is that they all look alike whether the link points to a postscript image, to another HTML document, to an audio clip, or to nowhere. Lacking information about the file at the end of the link, users can only click on a hypertext link and ponder the question, "How long is THIS gonna take?".

There are several technical factors that affect this answer including: the distance to the machine which provides the file specified by the hypertext link, the current network traffic, the power of the machine providing the file, the size of the file, and whether the specified machine serving the file and file itself even exist. While some of this information can be gleaned from the file's URL (Universal Resource Locator) which is displayed at the bottom of the screen while the pointer is over the link, much of the pertinent information is not available. Why should a user have to glean information from this network path? The Audible Web can give the user an auditory glance at this information by interpreting the network path for the user. When the user moves the pointer over a link, The Audible Web provides information about the type of file that Mosaic can expect to find at this network path location.

Additionally, The Audible Web also provides an auditory report on the network path information. This auditory report provides information about: the "distance" to the machine which provides the file specified by the hypertext link, the current network traffic, the power of the machine providing the file, the type and size of the file pointed to by the hypertext link, and whether the specified machine and file exist. By selecting a hypertext link with the Menu button (the right mouse button for right-handed people), the auditory report will display a sound indicating the proportional time to retrieve the file, a sound relating to the type of file found and a sound whose pitch varies according to the size of the file.

Activities and Feedback Specific to "The Audible Web"
  First, all the sonic feedback from "The Audible Web" can be controlled from a pop-up dial box. The dialog box is accessible from the "Audio Control . . ." option in the "Options" menu.

The "Data Transfer" Option
  This option, by default, is 'on'. When this option is 'on', auditory cues are played after selection of a link to another piece of data. Background sounds are played that give an indication of the progress of the data transfer.

The "User Actions" Option

This option, by default, is 'on'. When this option is 'on', auditory cues are displayed when various actions are taken by the user. For example, buttons clicks and menus selections make sound when they are chosen.

The "Menu Button Info" Option

This option, by default, is 'on'. When this option is 'on', users may request info about a url/link by using the "menu button" (the right mouse button for right handed-people). When the pointer is placed on a link and the menu button is clicked, information about the url's "distance" from the user is given, along with the type of file at the end of the url and the relative size of the file.

The "Pointer Over Link" Option

This option, by default, is 'off.' When this option is 'on' and the user moved the pointer over a link, an auditory cues is displayed which signifies the type of file that the link believes it is pointing at. That is, if the link's url specifies a text file, then the text file auditory cues is displayed. (A Subtle Note: this information is based on the belief about what is at the end of the link's url, not on whether it is actually there or not. The "Menu Button Info" Option checks for the existence of the data at the end of a link; this option does not.)

If you've got The Audible Web up and running right now, take a peek at *The Audible Web's Demo Page.* It's a good place to try some of the functionality of The Audible Web.

III. CHI '95 MOSAIC OF CREATIVITY May 7–11 1995 Short Papers

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. © 1995 ACM The Audible Web
Auditory Enhancements for Mosaic
  Michael C. Albers
  Georgia Institute of Technology
  Industrial & Systems Engineering
  765 Ferst Drive
  Atlanta, Ga. 30332-0205 USA
  +1 (404) 894-4318
  malber@chmsr.isye.gatech.edu
  Eric Bergman
  SunSoft, Inc.
  2550 Garcia Avenue, MTV 21-225
  Mountain View, Calif. 94043-1100 USA
  +1 (415) 336-5930
  eric.bergman@eng.sun.com

ABSTRACT

Interest in the World-Wide Web (WWW), a collection of hypermedia information distributed across the Internet, has exploded with the advent of Mosaic, a graphical user interface for navigating the WWW. In spite of Mosaic's popularity, studies have found usability problems in the original interface, especially with regard to feedback, terminology, and adherence to GUI guidelines [2, 4]. This paper reports on a preliminary investigation of auditory feedback as one approach to enhancing Mosaic's user interface. The Audible Web is Mosaic embedded with non-speech auditory cues intended to aid user monitoring of data transfer progress, provide feedback for user actions, and to provide content feedback to aid navigation of the WWW.

Keywords: Auditory interface, World-Wide Web, WWW, Mosaic user interface, Mosaic, WWW browsers.

INTRODUCTION

We chose Mosaic as a test platform for auditory enhancements because it exhibits known HCI problems: users get little or no feedback about the size and content of information referenced by links, time to obtain that information, and the results of ongoing processes [2, 4]. The highly visual task of scanning through text for links suggested to us that Mosaic users could benefit from audio. By using audio rather than visual enhancements, our aim was to provide more information while shifting additional cognitive load to a different modality.

WHY USE SOUND?

Non-speech auditory cues can complement visual interfaces by increasing a user's sense of engagement, enhancing monitoring of background processes, and reinforcing visually represented information [3, 5]. These principles are familiar to anyone who has played a video game with and without the sound effects.

In addition, there are situations when graphical information display may be inappropriate or invasive. For ongoing processes, auditory cues can notify users about progress, completion, and errors without distracting them from their visual task.

WHY THESE SOUNDS?

When possible, our choice of auditory cues was motivated by the existing literature [1, 6]. Building on Gaver's auditory icon research, everyday sounds were mapped to computer events by analogy with everyday sound-producing events [3]. Where possible, the sound of a real world event was chosen as an auditory cue (e.g., typewriter for a text file). The sounds that are not "realistic" were selected based on their subjective affordance (e.g., low heavy piano note for large files). All of the sounds used in The Audible Web are presented at low levels above background noise in an effort to inform rather than distract users.

ENHANCEMENTS PROVIDED BY SOUND

The Audible Web uses auditory cues to enhance the interaction between users and Mosaic in three ways: by aiding users' monitoring of data transfer in progress, by providing feedback for user actions, and by providing content feedback to aid navigation.

Monitor Data Transfer Progress

After users click on a hypermedia link in Mosaic, the globe icon spins and a series of technical messages are displayed at the bottom of the window. Not only are these cues obscure, they are of little use if a user's visual attention is focused elsewhere or Mosaic is iconified.

Because sound is particularly useful for monitoring time-varying processes [3, 5], The Audible Web provides auditory cues which provide progress feedback for normal data transfer, opening of external programs, and errors. While data transfer is progressing normally, users bear clicks and pops. A sliding sound indicates when an external program is opened. If there is a error, users hear the sound of breaking glass.

| Event | Auditory Cue |
|---|---|
| Data Transfer | Pops & Clicks |
| Error Condition | Breaking Glass |
| Open External Program | Sliding/Opening |

Feedback for User Actions

Ede and Roshak [2] found that many Mosaic users were unsure if menu items they selected had performed the requested action. The Audible Web provides feedback to reinforce user actions via auditory cues for button presses, menu selections, scroll bar movements, and link selections. The aim of this auditory feedback is to confirm actions without interrupting visual scanning and to heighten user engagement with The Audible Web by making sound an expected part of the interaction.

| User Action | Auditory Cue |
| --- | --- |
| Press Button | Ca-Chick |
| Select Menu Item | Click |
| Scroll Up/Down | short Pop |
| Select a Link | Bop-Bop |

Aid Navigation through Content Feedback

Whether a hypermedia link points to an image, another document, an audio clip, or to nowhere, every text-labeled link looks the same in Mosaic. Having little information about a link, users can only activate it and ponder the questions, "What information will I get?" and "How long will this take?".

Using non-speech audio, The Audible Web provides feedback about the probable type of information at the other end of a link before the link is activated. As users move the pointer over each link, a different audio cue plays to indicate various file types (See the table below). The aim of this feedback is to help users quickly decide if links point to information of interest to them.

By pressing the right mouse button when the pointer is over a link, users get auditory feedback for proportional transfer time, file type, file size, and errors. The length of time a tick-tock of a clock is played indicates the proportional data transfer time, an auditory cue indicates the file type, and a piano note conveys the size of the file (by varying pitch with file size). If the server is down or the file is not found, the user hears the sound of breaking glass.

For example, suppose that a user in New York queries a link that points to a small text file in London. The user hears a few seconds of the tick-tock sound (indicating proportional data transfer time) followed by the sound of a typewriter (indicating a text file) and a high piano note (indicating a small file).

| Event/Attribute | Auditory Cue |
| --- | --- |
| Relative Transfer Time | Tick-Tock |
| Error Condition | Breaking Glass |
| Pointer over Text File | Typewriter |
| Pointer over Graphics File | Camera Click |
| Pointer over Video File | 16mm Movie Projector |
| Pointer over Audio File | Musical Piano Flourish |
| Pointer over Application File | Modem/Line Noise |
| File Size | Piano Notes |

CONCLUSION

The Audible Web is a prototype that adds auditory cues to Mosaic to aid user monitoring of data transfer in progress, provide feedback for user actions, and provide content feedback to aid navigation of the WWW.

Our informal evaluation of The Audible Web suggests that audio has special value for informing users without distracting them from a primarily visual task. It becomes possible, for example, to query a link, but to go on reading while simultaneously learning more about the size, availability, type, and content pointed to by the link.

As users of The Audible Web, we find that the constant low level audio feedback for user actions as well as link events and attributes creates a ubiquitous audio environment, in which sounds are an expected part of interactions rather than a surprise or salient special event. This preliminary experience suggests further study is needed to understand how human-computer interactions are affected by environments in which audio is truly ubiquitous.

Naturally, there are many purposes for which audio is not well suited. Users can acquire an abstract sense of file size from audio cues, for example, but if they need to know that one file is 1.2 megabytes while another is 1.4 megabytes, non-speech audio may not provide the information they need. More work is needed to determine when and where audio is an appropriate interface element.

The Audible Web prototype suggests a host of research questions about the use of audio in applications. In future research, we must validate users' understanding of auditory cues, study the effectiveness of audio for enhancing user-interface interactions, and determine users acceptance of audio cues.

ACKNOWLEDGMENTS

We would like to thank the members of HCI,. COCO, and other groups at SunSoft for their help and support during Mike's summer internship.

REFERENCES

1. Ballas, J. A. (1994). Delivery of Information Through Sound. In G. Kramer (Ed.), *Auditory Display: Sonification. Audification and Auditory Interfaces* (pp 79–94). Reading, Mass.: Addison-Wesley Publishing Company.
2. Ede. M. & Roshak, L (1994). *Quick Findings for Mosaic Usability Test.* (Usability Engineering Report #94-12). Mountain View, Calif.: SunSoft.
3. Gaver, W. (1993). Synthesizing Auditory Icons. *Proceedings of INTERCHI '93* (pp 228–235). Amsterdam: ACM.
4. Groff. J-F & J. Descombes (1994). Untangling the Web. *Proceedings of the 1st International Conference on the World-Wide Web.* Geneva: http://wwwl.cern.ch/WWW94/PrelimProcs.html.
5. Kramer. G. (1994). An introduction to Auditory Display. In G. Kramer (Ed.), *Auditory Display: Sonification, Audification, and Auditory Interfaces* (pp 1–77). Reading, Mass.: Addison-Wesley Publishing Company.
6. Mynatt. E. D. (in press). Designing with Auditory Icons. *Proceedings of the International Conference on Auditory Display '94.* Santa Fe, N.M.

What is claimed is:

1. A computer-implemented method for presenting hypermedia link information comprising:

waiting for a hypermedia link to be indicated by an indication operation, wherein said hypermedia link points to a data file that resides on a first computer system, said indication operation does not cause data in said data file to be downloaded from said first computer system to a second computer system and said second computer system performs said computer-implemented method;

upon said indication operation being performed, requesting information about said data file, said information including at least one of a file size and a download time; and generating an auditory cue, wherein said auditory cue communicates said information about said data file to a user.

2. The method of claim 1, wherein said indication operation comprises positioning a cursor over a displayed representation of said hypermedia link.

3. The method of claim 2, wherein said indication operation further comprises receiving input from a user which indicates said hypermedia link is to be indicated.

4. The method of claim 1, wherein said indication operation comprises automatically indicating said hypermedia link.

5. The method of claim 1, wherein said generating comprises generating a first sound to indicate to said user whether a system on which said information resides is operational and whether said information exists on said system.

6. The method of claim 1, wherein said generating comprises generating a second sound to indicate to said user said information's type and quantity.

7. The method of claim 1, further comprising generating a visual cue to communicate said information about said data file to a user.

8. The method of claim 1, wherein said requesting comprises:

generating an information request to request said information;

sending said information request to said first computer system;

waiting for said information to be returned;

receiving said information; and processing said information.

9. The method of claim 8, wherein said generating comprises properly forming a hypertext transfer protocol HEAD request.

10. The method of claim 9, wherein said sending comprises transmitting said hypertext transfer protocol HEAD request to said first computer system.

11. The method of claim 8, wherein said processing comprises:

determining if said first computer system is functional;

determining if said data file exists; and parsing said information to recover characteristics of said data file.

12. The method of claim 11, wherein said characteristics comprise a size in bytes and a type of said data file.

13. The method of claim 1, wherein said requesting comprises:

generating an information request to request said information;

sending said information request to said first computer system;

generating an audible indication that said information request has been made;

waiting for said information to be returned while continuing to generate said audible indication;

receiving said information;

ceasing to generate said audible indication upon receiving said information; and processing said information.

14. The computer-implemented method of claim 1, further comprising:

a selection operation, said selection operation causing said data in said data file to be downloaded from said first computer system to said second computer system.

15. A computer-implemented method for configuring a presentation of hypermedia link information comprising:

requesting an explanation of information regarding said computer-implemented method using a first menu, if said explanation is desired;

indicating, using said first menu, that information about a potential transfer of data is desired, wherein said information and said data are stored on a first computer system;

indicating, using said first menu, that feedback to said user is to be generated upon said user taking one of a plurality of actions wherein said feedback is an auditory cue;

indicating, using said first menu, that information about a hypermedia link indicated by said user is to be provided to said user, wherein said indication by said user does not cause said data to be downloaded from said first computer system to a second computer system, said second computer system performing said computer-implemented method; and indicating, using said first menu, that said information about a hypermedia link indicated automatically is to be provided to said user automatically.

16. The method of claim 15, wherein said exiting comprises:

determining if said user selected a first exit selection from said first menu, and if said user selected a first exit selection,
configuring said presentation of hypermedia link information to conform to said indications, and
exiting said first menu.

17. The computer-implemented method of claim 15, further comprising:

a selection operation, said selection operation causing said data file to be downloaded from said first computer system to said second computer system.

18. A computer-implemented method for presenting hypermedia link information comprising:

retrieving a hypermedia page;

retrieving information about a data file represented by a hypermedia link on said hypermedia page in response to an indication operation, wherein said data file resides on a first computer system, said indication operation does not cause data in said data file to be downloaded from said first computer system to a second computer system and said second computer system performs said computer-implemented method; and presenting said information by generating an auditory cue.

19. The method of claim 18, wherein said first retrieving comprises:

generating an information request to request said information;

sending said information request to said first computer system;

waiting for said information to be returned;

receiving said information; and processing said information.

20. The method of claim 19, wherein said processing comprises:

determining whether said first computer system is functional;

determining whether said data file exists; and parsing said information to recover characteristics of said data file.

21. The method of claim 20, wherein said characteristics comprise a size in bytes and a type of said data file.

22. The computer-implemented method of claim 18, further comprising:

a selection operation, said selection operation causing said data file to be downloaded from said first computer system to said second computer system.

23. A first computer system comprising:

a network interface configured to transmit a request for data representing a selected page of a hypermedia document, said data stored as a data file on a second computer system coupled to said network interface, and return said data; and a processor, coupled to said network interface and configured to:

wait for a hypermedia link to be indicated by an indication operation, wherein said hypermedia link points to said data file and said indication operation does not cause said data to be downloaded from said second computer system to said first computer system;

request information about said data file upon said indication operation, said information including at least one of a file size and a download time; and present said information by generating an auditory cue.

24. The first computer system of claim 23, wherein said hypermedia document is in hypertext markup language format.

25. The first computer system of claim 23, wherein said processing system is configured to request information about said data file by virtue of being further configured to:

generate an information request to request said information;

send said information request to said second computer system;

wait for said information to be returned;

receive said information; and process said information.

26. The first computer system of claim 25, wherein said processing system is configured to generate said information request by virtue of being further configured to properly form a hypertext transfer protocol HEAD request.

27. The first computer system of claim 25, wherein said processing system is configured to send said information request to said second computer system by virtue of being further configured to transmit said hypertext transfer protocol HEAD request to said second computer system.

28. The first computer system of claim 25, wherein said processing system is configured to process said information by virtue of being further configured to:

determine whether said second computer system is functional;

determine whether said data file exists; and parse said information to recover characteristics of said data file.

29. The first computer system of claim 23, said processor further configured to:

receive a selection operation, said selection operation causing said data file to be downloaded from said second computer system to said first computer system.

30. A computer program product for presenting hypermedia information, said product comprising:

code that retrieves a selected hypermedia document;

code that waits for a hypermedia link within said selected hypermedia document to be indicated by an indication operation, wherein said hypermedia link points to a data file that resides on a first computer system, said indication operation does not cause data in said data file to be downloaded from said first computer system to a second computer system and said second computer system executes codes comprising said computer program product;

code that requests information about said data file upon said indication operation, said information including at least one of a file size and a download time;

code that presents said information by generating an auditory cue; and a computer-readable medium that stores the codes.

31. The computer program product of claim 30, wherein said hypermedia document is in hypertext markup language format.

32. The computer program product of claim 30, wherein said code that requests information about said data file further comprises:

code that generates an information request to request said information;

code that sends said information request to said first computer system;

code that waits for said information to be returned;

code that receives said information; and code that processes said information.

33. The computer program product of claim 32, wherein said code that generates said information request further comprises code that properly forms a hypertext transfer protocol HEAD request.

34. The computer program product of claim 32, wherein said code that sends said information request to said first computer system further comprises code that transmits said hypertext transfer protocol HEAD request to said first computer system.

35. The computer program product of claim 32, wherein said code that processes said information further comprises:

code that determines whether said first computer system is functional;

code that determines whether said data file exists; and code that parses said information to recover characteristics of said data file.

36. The computer program product of claim 30, further comprising:

code that receives a selection operation, said selection operation causing said data file to be downloaded from said first computer system to said second computer system.

* * * * *